(12) United States Patent
Kovacic et al.

(10) Patent No.: US 9,202,157 B2
(45) Date of Patent: Dec. 1, 2015

(54) RFID TAG WITH AN IMPROVED COMMUNICATION BETWEEN AN EXTERNAL LOGIC ELEMENT CONDUCTIVELY CONNECTED THERETO AND AN INTERROGATOR AS WELL AS A METHOD FOR SUCH COMMUNICATION

(75) Inventors: Kosta Kovacic, Maribor (SI); Vinko Kunc, Ljubljana (SI); Andrej Vodopivec, Ljubljana (SI)

(73) Assignee: AMS R&D D.O.O., Ljubljana (SI)

( * ) Notice: Subject to any disclaimer, the term of this patent is extended or adjusted under 35 U.S.C. 154(b) by 722 days.

(21) Appl. No.: 13/138,456

(22) PCT Filed: Feb. 23, 2010

(86) PCT No.: PCT/SI2010/000008
§ 371 (c)(1),
(2), (4) Date: Aug. 18, 2011

(87) PCT Pub. No.: WO2010/098727
PCT Pub. Date: Sep. 2, 2010

(65) Prior Publication Data
US 2011/0298588 A1    Dec. 8, 2011

(30) Foreign Application Priority Data
Feb. 27, 2009   (SI) .................................. 200900055

(51) Int. Cl.
*H04Q 5/22*      (2006.01)
*G06K 19/07*     (2006.01)
*G06K 19/077*    (2006.01)

(52) U.S. Cl.
CPC .............. *G06K 19/07* (2013.01); *G06K 19/077* (2013.01); *G06K 19/07741* (2013.01); *G06K 19/07769* (2013.01)

(58) Field of Classification Search
None
See application file for complete search history.

(56) References Cited

U.S. PATENT DOCUMENTS 5,802,325 A    9/1998  Le Roux
5,874,902 A *  2/1999  Heinrich et al. ........... 340/10.51
(Continued)

FOREIGN PATENT DOCUMENTS

CN    101023438 A    8/2007
CN    101233476 A    7/2008
(Continued)

OTHER PUBLICATIONS

"MLX90129 13.56 MHz Sensor Tag IC," Preliminary Data Sheet, Melexis Microelectronic Integrated Systems, Sep. 2008.

*Primary Examiner* — Curtis King
(74) *Attorney, Agent, or Firm* — McDermott Will & Emery LLP

(57) ABSTRACT

A memory access arbiter (MAA) in an RFID tag is connected to an unique address space (UAS), which comprises a non-volatile memory (NVM), a transferred data memory (TDM) and a status-information memory (SIM) storing information on the status of the transferred data memory (TDM). The transferred data memory (TDM) and the status-information memory (SIM) are volatile memories, e.g. of the RAM type having a memory capacity of 16 bits or 32 bits according to the standard of an applied RFID communication. The RFID tag of the invention provides for a faster communication between an interrogator and an external logic element by one order of magnitude, which is due to fast volatile memories for transferred data as well as for corresponding status information. A still higher communication rate is achieved by introducing a command that has not yet been standardized.

7 Claims, 2 Drawing Sheets

(56) References Cited

U.S. PATENT DOCUMENTS

Figure 1:
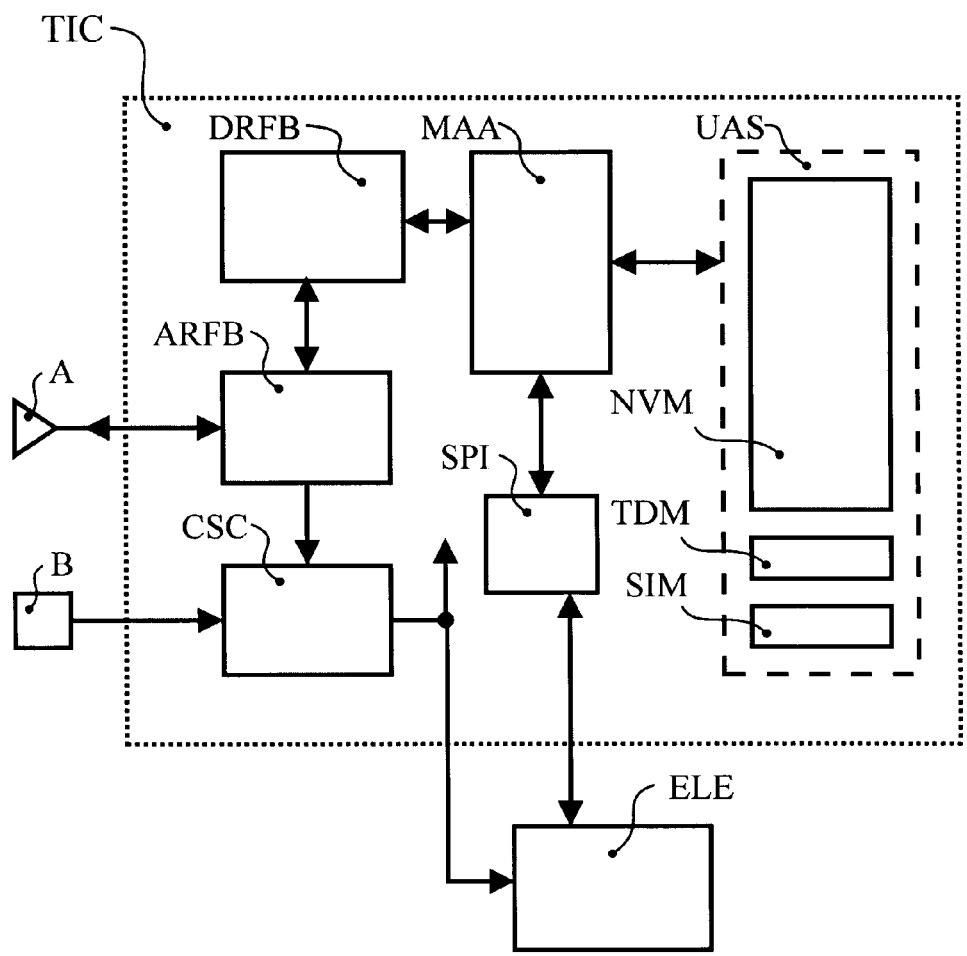

| | | | |
|---|---|---|---|
| 6,696,952 B2* | 2/2004 | Zirbes | 340/572.1 |
| 7,267,262 B1* | 9/2007 | Brown | 235/375 |
| 7,408,463 B2* | 8/2008 | Hammond et al. | 340/572.1 |
| 2004/0110533 A1 | 6/2004 | Yamagata et al. | |
| 2004/0145520 A1* | 7/2004 | Richardson et al. | 342/357.07 |
| 2005/0280511 A1* | 12/2005 | Yokoyama et al. | 340/10.5 |
| 2006/0026348 A1 | 2/2006 | Wallace et al. | |
| 2006/0069814 A1 | 3/2006 | Abraham et al. | |
| 2006/0208903 A1* | 9/2006 | Loh et al. | 340/572.8 |
| 2006/0232412 A1* | 10/2006 | Tabacman et al. | 340/572.1 |
| 2006/0244595 A1* | 11/2006 | Malone et al. | 340/572.1 |
| 2007/0239929 A1 | 10/2007 | Chen et al. | |
| 2007/0279190 A1* | 12/2007 | Lugt et al. | 340/10.1 |
| 2008/0316002 A1* | 12/2008 | Brunet et al. | 340/10.41 |
| 2009/0028334 A1* | 1/2009 | Balabine et al. | 380/270 |

FOREIGN PATENT DOCUMENTS

| | | |
|---|---|---|
| JP | 2007049418 A | 2/2007 |
| SI | 22945 A | 6/2010 |
| TW | 200817994 A | 4/2008 |
| WO | WO-2010/071611 A1 | 6/2010 |

* cited by examiner

RFID TAG WITH AN IMPROVED COMMUNICATION BETWEEN AN EXTERNAL LOGIC ELEMENT CONDUCTIVELY CONNECTED THERETO AND AN INTERROGATOR AS WELL AS A METHOD FOR SUCH COMMUNICATION

This is a national stage of PCT/SI10/000008 filed Feb. 23, 2010 and published in English, which claims the priority of Slovenia number 200900055 filed Feb. 27, 2009, hereby incorporated by reference.

The present invention relates to an RFID tag with an improved communication between an external logic element conductively connected thereto and to an interrogator, in which RFID tag an antenna is connected to a memory access arbiter, which is on the one side connected to a non-volatile memory and on the other side it is connected through a serial peripheral interface to the external logic element. The present invention also relates to a method for such communication.

An RFID tag is usually self-sufficient in its operation, which is advantageously reflected in its price.

Furthermore, there is also known an RFID tag provided with a battery power supply combined with a passive supply of power, which a tag antenna picks up from the radio-frequency radiation field generated by an interrogator (SI 2008 0 0309 A). An automatic selection of a way of supplying the RFID tag is provided for in a way that it is stably supplied by the battery as long as possible, however, this is rendered possible for a longer time due to a very low voltage drop across a controlled switching circuit, and that a supply by a radio-frequency radiation field is selected only when the battery gets depleted. Such RFID tag may be provided with one or several sensors acquiring magnitudes of physical quantities related to a tagged article.

Nevertheless, an RFID tag is normally not designed for extending the applicability and adding new functions, as no external element can be added on.

There is known an RFID tag designed for a communication between an external logic element connected thereto and an interrogator (JP 2007049418 A). An integrated circuit of the tag comprises an RFID interface, an interface for a serial contact communication and a non-volatile memory to store data and programs. A data transfer from the interrogator to the external logic element is carried out by using a command transmitted by the interrogator. The data transferred from the interrogator are stored in the non-volatile memory of the tag and then read by the external logic element. The storing of data into the non-volatile memory takes as much as several milliseconds. A low data transfer rate resulting herefrom is disadvantageous. Moreover, an implementation of said function into the existing RFID infrastructure is complicated since an additional data transfer command, which is not prescribed by the standard, is needed.

There is also known an integrated circuit MLX90129 of an RFID tag. A communication between an external logic element conductively connected to said RFID tag and an interrogator is here designed as an additional function. No additional command is needed to execute said function. A tag antenna is connected to a memory access arbiter, which is on the one side connected to a non-volatile memory and on the other side through a serial peripheral interface to the external logic element. Said communication is carried out by means of a non-volatile EEPROM memory of the tag. The interrogator writes the data into said non-volatile memory. The RFID tag issues an interrupt request transferred to the external logic element. Said external logic element then requests the data in the RFID tag to be read. The data read in the RFID tag are transferred to the external logic element and the data from the external logic element are transferred into the RFID tag and further into the interrogator after the status information has been checked. A disadvantage of the communication by means of an RFID tag between the interrogator and the external logic element exists in that the writing of each word into the non-volatile memory of the tag takes as much as several milliseconds.

The invention solves the technical problem to improve an RFID tag circuit as well as a method to shorten a time needed for a communication between an interrogator and an external logic element connected to the RFID tag whereat, in the first place, an embodiment using only standardized commands of the RFID infrastructure should be proposed and, in the second place, to additionally shorten said time an embodiment using also a command, which as far has not yet been used in the RFID infrastructure so far, should also be proposed.

Said technical problem is solved by the improved RFID tag of the invention with an improved communication between an external logic element conductively connected thereto and an interrogator whereat said RFID tag is characterized by the features of the characterizing portion of the first claim and dependent claims 2 to 4 characterize the variants of the embodiment. Said technical problem is also solved by the improved method of the invention, the embodiments of which are characterized by the features of the characterizing portion of the fifth and sixth claims.

The RFID tag of the invention provides for a faster communication between an interrogator and an external logic element by one order of magnitude, which is due to fast volatile memories for transferred data as well as for corresponding status information. However, a still higher communication rate is achieved by introducing a command that has not yet been standardized.

Figure 2:
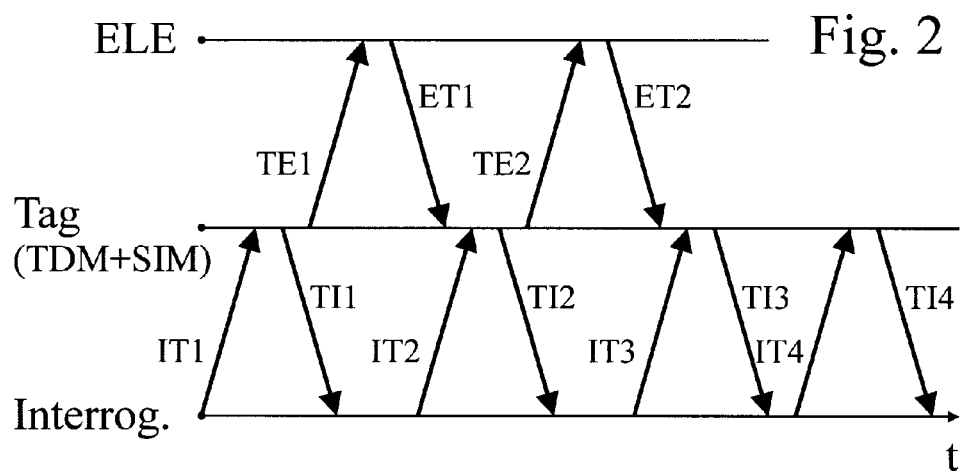
Figure 3:
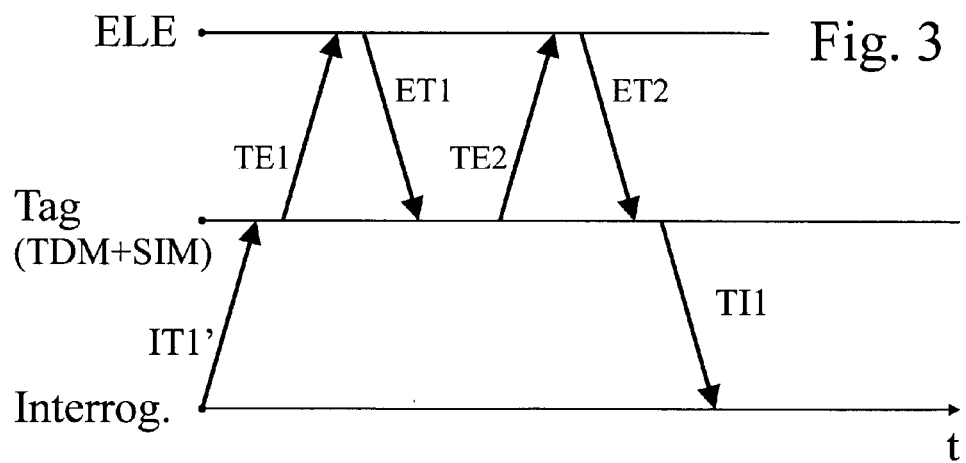

The invention will now be explained in more detail by way of a description of embodiments and with reference to the accompanying drawing representing in:

FIG. 1 a schematic presentation of an RFID tag improved by the invention together with an external logic element, and FIGS. 2 and 3 a schematically presented time chart of a communication between an interrogator and the external logic element according to the first and second embodiments of the improved method of the invention.

An RFID tag improved by the invention and designed for a communication between an interrogator and an external logic element ELE, e.g. a microcontroller conductively series-connected to the RFID tag, is provided on a tag integrated circuit TIC (FIG. 1). An antenna A, a supply battery B and the external logic element ELE are connected to the tag integrated circuit TIC.

The antenna A is connected through an analogue radio-frequency block ARFB and a digital radio-frequency block DRFB to a memory access arbiter MAA. The memory access arbiter MAA is on the one side connected to a non-volatile memory NVM and on the other side it is connected through a serial peripheral interface SPI to the external logic element ELE.

The RFID tag designed for the communication between the interrogator and the external logic element ELE is improved according to the invention in the following way.

A unique address space UAS is built up in the RFID tag. Said unique address space UAS comprises the non-volatile memory NVM, a transferred data memory TDM and a status-information memory SIM storing information on the status of the transferred data memory TDM. The memory access arbiter MAA is connected to the unique address space UAS.

The transferred data memory TDM as well as the status-information memory SIM should be volatile memories. They actually are memory locations of said kind and have a memory capacity according to the standard of an applied RFID communication: 32 bits at ISO 15693 and 16 bits at EPC GEN2 (ISO 18000-6/c).

Therefore, the transferred data memory TDM and the status-information memory SIM can be random-access memories. A time in the order of magnitude of only one nanosecond is needed for writing data into the RAM memory. A processing time being in the order of magnitude of 100 microseconds becomes noticeable at so fast data writing. Total time of data storing into the RAM memory is for one order of magnitude shorter than the time of data storing into the non-volatile memory. Hence, the communication improved by the invention between the interrogator and the external logic element ELE proceeds faster than such communication known so far.

An address of the transferred data memory TDM and an address of the status-information memory SIM should be adjacent addresses in the unique address space UAS. It is advantageous for the application to have the transferred data memory TDM located at a first or a last address in the unique address space UAS.

The RFID tag with the improved communication between the interrogator and the external logic element ELE is further improved in the following respect. The external logic element ELE as well as the memory access arbiter MAA, the serial peripheral interface SPI as well as the memories in the unique address space UAS can be also supplied from the battery B through a controlled switched circuit CSC. The controlled switched circuit CSC is disclosed in the patent application SI 2008 0 0309 (PCT/SI2009/000066). An automatic selection of the power supply mode is available to said blocks in the tag and to the external logic element ELE.

The continuation will present an improved method of the invention for the communication between the interrogator and the external logic element ELE, which is conductively connected to the RFID tag. The improved method of the invention is carried out by means of the improved RFID tag disclosed above.

A time development of the communication between the interrogator and the external logic element ELE according to a first embodiment of the method of the invention is schematically represented in FIG. 2.

Data from the interrogator are transferred to the RFID tag in a first step IT1. The RFID tag acknowledges said data transfer to the interrogator in a second step TI1. The RFID tag then issues an interrupt request transferred to the external logic element ELE in a third step TE1. The external logic element ELE requests the data in the RFID tag to be read and transferred to itself in a fourth step ET1. The data read in the RFID tag are transferred to the external logic element ELE in a fifth step TE2 and thereafter the data from the external logic element ELE are transferred to the RFID tag in a sixth step ET2.

However, the interrogator hitherto in the known way repeats requesting the information on the status of the transferred data memory TDM to be read in subsequent intermediate steps IT2, IT3, ... of a first kind and said status information repeats to be transferred from the RFID tag to the interrogator in subsequent intermediate steps IT2, IT3, ... of a second kind. On the basis of the read status information, the interrogator checks whether new data, which should have been transferred from the external logic element ELE into the RFID tag or, in other words, have been transferred in the sixth step ET2, are already stored in the RFID tag.

Only when the data from the external logic element ELE have been transferred to the RFID tag in the sixth step ET2 and the information on the new status of the transferred data memory TDM has been transferred from the RFID tag to the interrogator in a seventh step TI3 the interrogator in an eighth step IT4 requests in a known way said new data in the RFID tag to be read. The new data are transferred from the RFID tag to the interrogator in a nineth step TI4.

The method for the communication between the interrogator and the external logic element ELE is improved according to the invention in that the transferred data are stored in the RFID tag in the transferred data memory TDM, which is a volatile memory, and that said information on the status of the transferred data memory TDM is stored in the RFID tag in a status-information memory SIM, which is a volatile memory. As a fast volatile memory a random-access memory can be used, for example.

The communication between the interrogator and the external logic element ELE improved in such way proceeds faster than a communication known so far, in spite of the fact that the data transfer from the interrogator to the external logic element ELE and back is carried out by means of the existing set of standardized RFID commands to write and read.

A time development of the communication between the interrogator and the external logic element ELE according to a second embodiment of the method of the invention is schematically represented in FIG. 3.

Data from the interrogator are transferred to the RFID tag in a first step IT1'. The RFID tag issues an interrupt request, which is transferred to the external logic element ELE in a second step TEl Said external logic element ELE requests the data in the RFID tag to be read and transferred to itself in a third step ET1. The data read in the RFID tag are transferred to the external logic element ELE in a fourth step TE2 and then the data from the external logic element ELE are transferred to the RFID tag in a fifth step ET2.

The method for the communication between the interrogator and the external logic element ELE is improved according to the invention already at its very beginning in that the command for carrying out the first step IT1' is improved. A command that the RFID tag shall wait for new data and then transfer them to the interrogator is transferred from the interrogator to the RFID tag together with the data in the first step IT1'. The RFID tag then waits till the data have been transferred to the RFID tag from the external logic element ELE. Hence, after the first step IT1' has been performed the RFID tag does not acknowledge the data transfer in this step neither communication in steps IT2, TI2; IT3, TI3, ... from said first embodiment starts between the interrogator and the RFID tag, in which steps the interrogator requested the status information from the RFID tag and the RFID tag transferred said information to it. The command for carrying out said first step IT1' is new and has not yet been standardized in the RFID technology.

Then according to the invention said new data, which in the mean time have been transferred from the external logic element ELE, are transferred from the RFID tag to the interrogator in a sixth step TI1.

The method for the communication between the interrogator and the external logic element ELE is further improved according to the invention in that the transferred data are stored in the RFID tag in the transferred data memory TDM, which is a volatile memory, a random-access memory for example.

The communication between the interrogator and the external logic element ELE according to the second embodiment of the improved method proceeds faster than a communication known so far since a time to write data into the RFID tag is saved and with a new set of commands a number of steps in communication between the interrogator and the RFID tab is decreased.

The invention claimed is:

1. An RFID tag with an improved communication between an external logic element conductively connected to the RFID tag and an interrogator,
wherein an antenna is connected to a memory access arbiter in the RFID tag, wherein the memory access arbiter on one side is connected to a non-volatile memory and on another side is connected through a serial peripheral interface to the external logic element,
wherein the memory access arbiter is connected to a unique address space,
wherein the unique address space comprises the non-volatile memory, a transferred data memory and a status-information memory storing information on the status of the transferred data memory,
wherein the transferred data memory and the status-information memory are volatile memories,
wherein the transferred data memory is designed to store data which are transferred from the external logic element into the RFID tag,
wherein the RFID tag comprises a controlled switched circuit and a battery is connected to the RFID tag,
wherein the external logic element is connected through the controlled switched circuit of the RFID tag to a power supply from an interrogator radio-frequency radiation field as well as to the battery, which is an external source to supply power to the RFID tag,
wherein an automatic selection of the power supply mode is available to the external logic element as well as to the memory access arbiter, the serial peripheral interface, and the memories in the unique address space, and
wherein the external logic element comprises a microcontroller conductively connected to the RFID tag.

2. The RFID tag according to claim 1,
wherein the transferred data memory and the status-information memory are random-access memories.

3. The RFID tag according to claim 1,
wherein an address of the transferred data memory and an address of the status-information memory are adjacent addresses in the unique address space.

4. A method for an improved communication by means of an RFID tag between an interrogator and an external logic element, which is conductively connected to said RFID tag,
wherein data are transferred from the interrogator to the RFID tag in a first step,
the RFID tag acknowledges said data transfer to the interrogator in a second step and then issues an interrupt request transferred to the external logic element in a third step,
in a fourth step said external logic element requests the data in the RFID tag to be read and transferred to itself,
the data read in the RFID tag are transferred to the external logic element in a fifth step and new data from the external logic element are transferred to the RFID tag in a sixth step,
but after the second step the interrogator hitherto repeats requesting the information on the status of a transferred data memory to be read in subsequent intermediate steps of a first kind and said status information repeats to be transferred from the RFID tag to the interrogator in subsequent intermediate steps of a second kind, and
after the sixth step had been performed the information on the new status of the transferred data memory is transferred from the RFID tag to the interrogator in a seventh step, and
in an eighth step the interrogator requests the new data in the RFID tag to be read and the new data are transferred from the RFID tag to the interrogator in a ninth step,
wherein the transferred new data are stored in the RFID tag in the transferred data memory, which is a volatile memory, and
wherein said information on the status of the transferred data memory is stored in the RFID tag in a status-information memory, which is a volatile memory.

5. A method for an improved communication by means of an RFID tag between an interrogator and an external logic element, which is conductively connected to said RFID tag,
wherein data are transferred from the interrogator to the RFID tag in a first step,
the RFID tag issues an interrupt request, which is transferred to the external logic element in a second step,
the external logic element requests the data in the RFID tag to be read and transferred to itself in a third step,
the data read in the RFID tag are transferred to the external logic element in a fourth step and new data from the external logic element are transferred to the RFID tag in a fifth step,
wherein a command, consisting in that the RFID tag shall wait for the new data until they are transferred to the RFID tag from the external logic element, together with the data is transferred from the interrogator to the RFID tag in the first step,
wherein thereafter the new data are transferred from the RFID tag to the interrogator in a sixth step and
wherein in the fifth step the transferred new data are stored in the RFID tag in a transferred data memory, which is a volatile memory.

6. An RFID tag with an improved communication between an external logic element conductively connected to the RFID tag and an interrogator,
wherein an antenna is connected to a memory access arbiter in the RFID tag, wherein the memory access arbiter on one side is connected to a non-volatile memory and on another side is connected through a serial peripheral interface to the external logic element,
wherein the memory access arbiter is connected to a unique address space,
wherein the unique address space comprises the non-volatile memory, a transferred data memory and a status-information memory storing information on the status of the transferred data memory,
wherein the transferred data memory and the status-information memory are volatile memories,
wherein the transferred data memory is designed to store data which are transferred from the external logic element into the RFID tag,
wherein:
data are transferred from the interrogator to the RFID tag,
the RFID tag acknowledges the data transfer to the interrogator and then issues an interrupt request transferred to the external logic element,
the external logic element requests the data in the RFID tag to be read and transferred to itself,
the data read in the RFID tag are transferred to the external logic element and new data from the external logic element are transferred to the RFID tag, after the RFID acknowledges the data transfer to the interrogator, the interrogator hitherto repeats requesting the information on the status of a transferred data memory to be read in subsequent actions of a first kind and the status information repeats to be transferred from the RFID tag to the interrogator in subsequent actions of a second kind, and after new data from the external logic element are transferred to the RFID tag, the information on the new status of the transferred data memory is transferred from the RFID tag to the interrogator, and the interrogator requests the new data in the RFID tag to be read and the new data are transferred from the RFID tag to the interrogator, wherein the transferred new data are stored in the RFID tag in the transferred data memory, which is a volatile memory, and wherein the information on the status of the transferred data memory is stored in the RFID tag in a status-information memory, which is a volatile memory.

7. An RFID tag with an improved communication between an external logic element conductively connected to the RFID tag and an interrogator, wherein an antenna is connected to a memory access arbiter in the RFID tag, wherein the memory access arbiter on one side is connected to a non-volatile memory and on another side is connected through a serial peripheral interface to the external logic element, wherein the memory access arbiter is connected to a unique address space, wherein the unique address space comprises the non-volatile memory, a transferred data memory and a status-information memory storing information on the status of the transferred data memory, wherein the transferred data memory and the status-information memory are volatile memories, wherein the transferred data memory is designed to store data which are transferred from the external logic element into the RFID tag, wherein:
  data are transferred from the interrogator to the RFID tag,
  the RFID tag issues an interrupt request, which is transferred to the external logic element,
  the external logic element requests the data in the RFID tag to be read and transferred to itself,
  the data read in the RFID tag are transferred to the external logic element and new data from the external logic element are transferred to the RFID tag,
  wherein a command, consisting in that the RFID tag shall wait for the new data until they are transferred to the RFID tag from the external logic element, together with the data is transferred from the interrogator to the RFID tag, wherein thereafter the new data are transferred from the RFID tag to the interrogator, and wherein the transferred new data are stored in the RFID tag in a transferred data memory, which is a volatile memory.

* * * * *